United States Patent [19]

Arnold et al.

[11] Patent Number: 5,442,699

[45] Date of Patent: Aug. 15, 1995

[54] SEARCHING FOR PATTERNS IN ENCRYPTED DATA

[75] Inventors: William C. Arnold, Mahopac; David M. Chess, Mohegan Lake; Jeffrey O. Kephart, Yorktown Heights; Gregory B. Sorkin; Steve R. White, both of New York, all of N.Y.

[73] Assignee: International Business Machines Corporation, Armonk, N.Y.

[21] Appl. No.: 342,519

[22] Filed: Nov. 21, 1994

[51] Int. Cl.⁶ .............................................. G11B 23/28
[52] U.S. Cl. ........................................ 380/4; 380/1; 380/25
[58] Field of Search ................................. 380/1, 4, 25

[56] References Cited

U.S. PATENT DOCUMENTS

| | | | |
|---|---|---|---|
| 5,278,901 | 1/1994 | Shieh et al. | 380/4 |
| 5,319,776 | 6/1994 | Hile et al. | 380/4 X |
| 5,355,412 | 10/1994 | Kangas | 380/23 |
| 5,359,659 | 10/1994 | Rosenthal | 380/4 |
| 5,398,196 | 3/1995 | Chambers | 364/580 |

OTHER PUBLICATIONS

David Chess, "Virus Verification and Removal–Tools and Techniques", Virus Bulletin, dtd Nov. 1991, pp. 7–11.

Dan Greene, et al. "Multi-Index Hashing for Information Retrieval", dtd Jan. 4, 1994.

Sun Wu, et al. "Fast Text Searching with Errors", Department of Computer Science Bul, University of Arizona, dtd Jun. 1991.

*Primary Examiner*—Gilberto Barron, Jr.
*Attorney, Agent, or Firm*—Whitham, Curtis, Whitham & McGinn; Robert P. Tassinari

[57] ABSTRACT

A searching method determines, given a specified encryption method (or set of encryption methods) and a specified pattern (or set of patterns), whether a given text contains an encryption, with any key, of anything fitting the pattern or patterns. The procedure detects and locates patterns that are present within data that has been encrypted, provided that the encryption method is one of a variety of simple methods that are often employed by computer programs such as computer viruses. The method includes:

1. applying an invariance transformation to the chosen pattern (or set of patterns) to be matched, to obtain a "reduced pattern";
2. applying the same reduction to the encrypted data to obtain "reduced data";
3. using standard string searching techniques to detect the existence of a match between the reduced pattern and the reduced data, thereby signalling the likely existence of the pattern in encrypted form within the encrypted data;
4. corroborating any such likely matches by using techniques specialized to the particular form of encryption; and
5. providing information about the match.

Depending on the nature of the encryption method and the desired degree of certainty about the match, item 4 may not be necessary. In one embodiment, the patterns and an indication of the encryption method(s) for which they are appropriate are incorporated into the database of a computer virus searcher. The searcher applies each of several different invariant transformations to the searched data (one for each encryption method of interest), and uses search techniques, such as parallel search techniques currently employed by virus searchers, to detect any patterns that may be encrypted within the searched data.

24 Claims, 2 Drawing Sheets

SEARCHING FOR PATTERNS IN ENCRYPTED DATA

CROSS-REFERENCE TO RELATED APPLICATION

This application is related in subject matter to application Ser. No. 08/342,949, filed concurrently herewith by Gregory Bret Sorkin, Jeffrey Owen Kephart and David Michael Chess for "Automatic Analysis of a Computer Virus's Structure and Means of Attachment to its Hosts" and assigned to a common assignee (IBM Docket YO994-088), the disclosure of which is incorporated herein by reference.

BACKGROUND OF THE INVENTION

1. Field of the Invention

The present invention generally relates to automatic search for one or more patterns which may be contained within a body of text or computer data in encrypted form and, more particularly, to searching for encrypted patterns within computer viruses.

2. Description of the Prior Art

Searching computer programs or data for one or more occurrences of a specified pattern or set of patterns is one of the most common computer applications, implemented for example by the Unix utility "grep". A pattern may be a simple string or something more complex, such as any sentence generated by a grammar.

One important application for searching is computer virus detection. If the searched data is found to contain a "virus signature" pattern, this is taken to be a strong indication that the data contains a virus corresponding to that signature.

In order to evade detection via simple signatures, some viruses employ simple encryption schemes. Such self-encrypting viruses have a relatively small "degarbling head" that remains unencrypted. When the virus is executed, control passes first to the degarbling head, which decrypts the body of the virus and then passes control to it. The body performs the main function of the virus, presumably including attaching a newly-encrypted copy of the virus to some new host. The appearance of such a virus varies with the encryption key even though the underlying computer code is always the same.

One approach to searching for such self-encrypting viruses is to avoid the encrypted regions, and to search for patterns in the unencrypted "degarbling head". This is feasible if the head is substantially constant from one instance of the virus to another, and contains byte sequences that permit the choice of a signature pattern that is sufficiently unusual to reduce the probability of discovering the pattern in legitimate software (the "false positive" probability) to an acceptably low level. However, some highly polymorphic viruses have highly variable degarbling heads, the variability resulting not from encryption, but from permutations of code fragments, random insertion of irrelevant instruction sequences that have no influence, and other techniques. This makes it difficult or impossible to select suitable signatures. Another drawback is that many different viruses may have the same decrypting head, and the use of a fixed signature would not be able to distinguish amongst them.

A second approach is to use the virus itself to perform its own decryption, and then to use any of a variety of standard string searching methods to search the resulting plaintext. This allows a signature to be chosen from an encrypted region of the file, greatly increasing the selection of potential signatures. Moreover, there are families of related computer viruses which share large portions of code. Since the shared code may come from encrypted regions of the viruses, detecting a virus on the basis of information contained within the encrypted region may enable many viruses to be detected with a single signature, which might not be possible if detection were based solely on the degarbling head.

There are two basic methods in widespread use for persuading a virus to decrypt itself. The first applies to a situation in which the presence of the virus is discovered only after it has already been loaded into memory. In such a case, a virus stored in encrypted form decrypts itself when it is loaded into memory. Then standard string searching techniques can be used to search memory for the presence of plaintext signatures. Of course, this method is limited to cases where the virus has recently been active. It is not prophylactic: it cannot be used to screen as yet unexecuted, incoming software for the presence of viruses.

The second method for using a virus to perform its own decryption is to interpret it; that is, to simulate its execution in a virtual environment. One can interpret the loop that performs the decryption to produce a plaintext that can be searched for fixed signatures in the usual manner. Such a technique can be effective in detecting a large class of viruses. However, this technique has several drawbacks, including the practical difficulties of employing an interpreter.

The disadvantages of detecting encrypted viruses by either avoiding the encrypted regions or getting the virus to decrypt itself could be overcome if there were a method for searching the encrypted regions directly, without any need for decryption.

SUMMARY OF THE INVENTION

It is therefore an object of the present invention to provide a method of determining, given a specified encryption method (or set of encryption methods) and a specified pattern (or set of patterns), whether a given text contains an encryption, with any key, of anything fitting the pattern or patterns.

Each pattern may be a fixed string, a string with wildcards (positions at which any character is allowed), or a grammar such as a regular expression; most generally, then, a pattern is a potentially infinite set of strings.

The invention detects and locates patterns that are present within data that has been encrypted, provided that the encryption method is one of a variety of simple methods that are often employed by computer programs such as computer viruses. The method according to the invention includes:

1. applying an invariance transformation to the chosen pattern (or set of patterns) to be matched, to obtain a "reduced pattern";
2. applying the same reduction to the encrypted data to obtain "reduced data";
3. using standard string searching techniques to detect the existence of a match between the reduced pattern and the reduced data, thereby signalling the likely existence of the pattern in encrypted form within the encrypted dam;
4. corroborating any such likely matches by using techniques specialized to the particular form of encryption; and 5. reporting information on each match, such as the identity of the matched pattern, the text file and offset where the match occurred, and the number of errors, if any, in the match.

Depending on the nature of the encryption method and the desired degree of certainty about the match, item 4 may not be necessary.

In one embodiment of the invention, the patterns and an indication of the encryption method(s) for which they are appropriate are incorporated into the database of a computer virus searcher. The searcher applies each of several different invariant transformations to the searched data (one for each encryption method of interest), and uses search techniques, such as parallel search techniques currently employed by virus searchers, to detect any patterns that may be encrypted within the searched data. Application of any invariant to the text can occur at the same time as searching for patterns; that is, the invariant need not be computed, in its entirety, first. At the opposite extreme, the ith byte of the invariant can be computed and passed on to the searching engine, the same done for the (i+1)st byte, and so forth. This avoids having two full copies of the text (original and invariant) at any time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
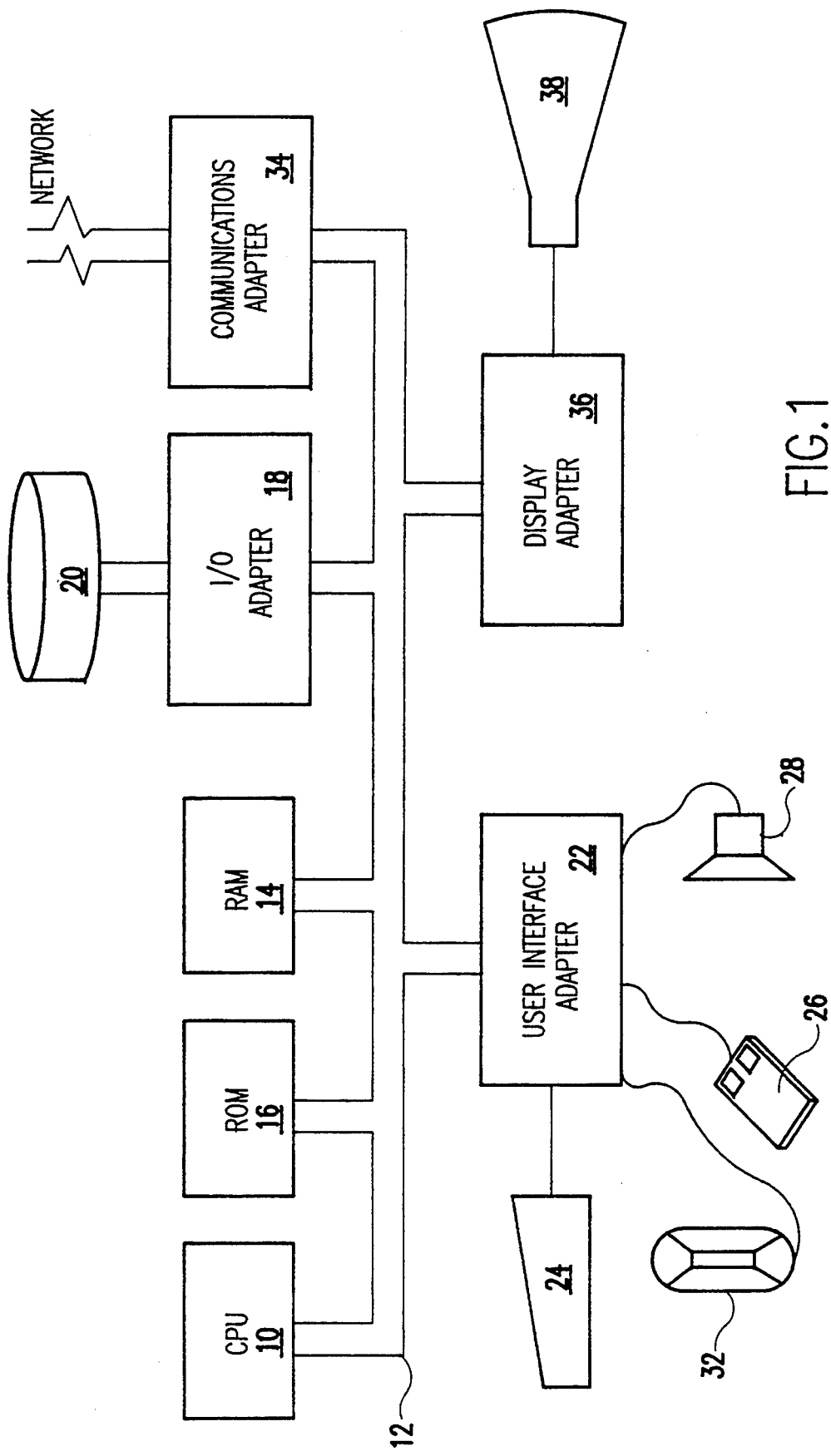
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer, such as the International Business Machines (IBM) Corporation's PS/2 series of personal computers, or a work station, such as IBM's RS/6000 Workstations. These are but representative examples, and it will be understood by those skilled in the data processing arts that the invention is not limited to these computers and may be advantageously practiced on other and different computers including mini and mainframe computers.

For the specific example of a personal computer, the hardware includes a central processing unit (CPU) 10, which may be, for example, a microprocessor supporting the X86 architecture of Intel Corporation, or a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The user interface adapter 22 has attached to it a keyboard 24, a mouse 26, a speaker 28, a microphone 32, and/or other user interface devices (not shown). The personal computer also includes a display 38, here represented as a cathode ray tube (CRT) display but which may be a liquid crystal display (LCD) or other equivalent display. The display 38 is connected to the system bus 12 via a display adapter 34. Optionally, a communications adapter 34 is connected to the bus 12 and to a network, for example, a local area network (LAN), such as IBM's Token Ring LAN. Alternatively, the communications adapter may be a modem connecting the personal computer to a telephone line as part of a wide area network (WAN).

Figure 2:
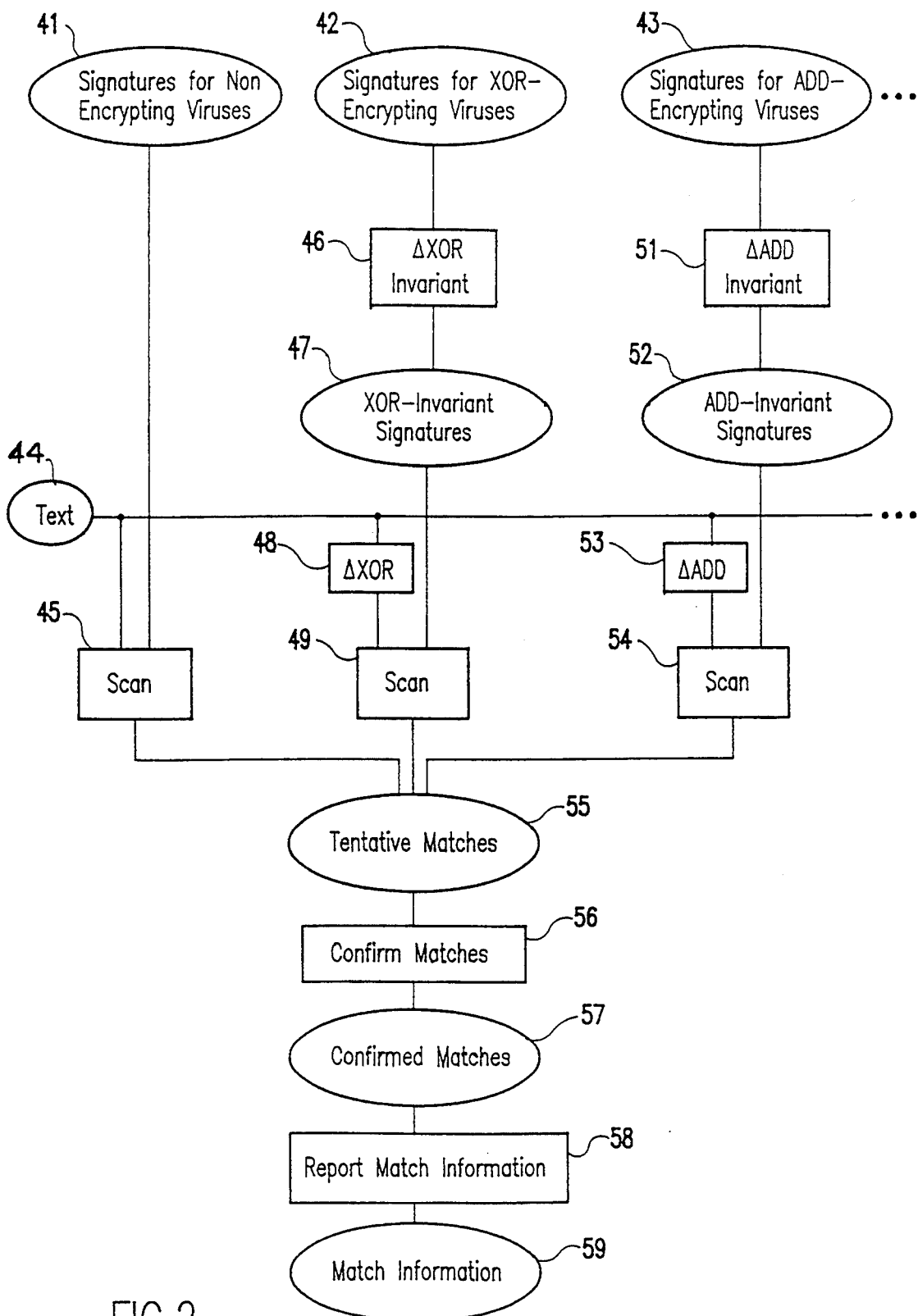
FIG. 2 is a flow diagram showing the logic of the searching method according to the invention.

The preferred embodiment of the invention may be implemented on the personal computer shown in FIG. 1, which is but a representative example of the hardware on which the invention may be implemented. The process according to the invention will now be described by way of a specific example shown in FIG. 2. More particularly, FIG. 2 shows a flow diagram of the logic of the processes according to a preferred embodiment of the invention, illustrating the case for computer viruses. As described in more detail below, there are a number of encryption methods in more or less common use, and in some cases, a computer virus is not encrypted at all. FIG. 2 outlines the operation of the invention for three representative cases, but it will be understood that many more cases are contemplated. For each pattern of interest, a signature is provided. The cases shown are signatures for non-encrypting viruses 41, signatures for exclusive-OR (XOR) encrypting viruses 42, and signatures for ADD-encrypting viruses 43. Text 44 of the program is input for searching against the known signatures. In the case of non-encrypting viruses, this is a direct search 45 of the text 44 of executable code against the signature 41. However, for those patterns where it is of interest to detect, in the text 44, encryptions of the pattern rather than just the pattern itself (e.g., patterns from self-encrypting computer viruses), the signatures may be subjected to an invariant transformation appropriate to the type of encryption.

Thus, in the case of the signatures for self-encrypting viruses, the first step is to apply a transformation to derive invariant versions of the signatures and the text before the searching process. For each invariant, the result of application of that invariant to the text is scanned for all the invariant signatures of the same type. For example, the $\Delta$XOR invariant transformation 46 is applied to XOR-encrypting viruses 42 to derive XOR-invariant signatures 47. The text 44 is subjected to a similar $\Delta$XOR transformation 48 before the search 49 is made. Similarly, an $\Delta$ADD invariant transformation 51 is made on the signatures for ADD-encrypting viruses 43 to derive ADD-invariant signatures 52 and a similar $\Delta$ADD transformation 53 is made of the text 44 before the search 54 is made. Other transformations and searches are made to detect signatures of other types of self-encrypting viruses.

Application of any invariant to the text can occur at the same time as searching for patterns. The invariant need not be computed, in its entirety, first. At the opposite end of the extreme, the ith byte of the invariant can be computed and passed on to the searching engine, the same done for the (i+1)th byte, and so forth. This avoids having two full copies of the text (original and invariant) at any time.

The outputs, if any, of the search operations 45, 49 and 54 are tentative matches 55. In the preferred embodiment of the invention, it is desirable to corroborate the tentative matches; however, this step is optional. If the tentative matches are to be corroborated, the matches are confirmed at step 56, and the output are the confirmed matches 57. The final step 58 is to report information on the match. This information would typically include the identity of the matched pattern, the text file and offset where the match occurred, and the number of errors, if any, in the match. The match information is output at 59.

With this brief overview of the invention, a fuller description is now given of:
1. examples of invariance transformations, and means for applying them to both the pattern(s) to be matched and the data to be searched for those pattern(s);
2. means for applying standard string searching techniques to detect the existence of a match between the reduced pattern and the reduced data; and
3. means for corroborating any such likely matches in cases where such corroboration is desirable.

Encryption-Invariant Transformations

For a variety of encryption methods commonly used by computer viruses, there are simple invariant transformations which map any encryption of the same data to the same value. These encryption methods also have the property that encryption with a zero key is the identity operation; e.g., the ciphertext is equal to the plaintext. Thus, the result of applying the invariant function (or simply "invariant") to any encryption of the plaintext is equal to the result of applying the invariant to the plaintext itself.

In general, encryption methods do not possess simple invariants. The fact that encryption methods possessing invariants are nonetheless prevalent in computer viruses can be attributed to the obviousness, compactness, and speed of these methods.

A number of encryption methods in more or less common use are now described, and efficient invariants appropriate to each of them presented. Some of the invariants are useful for several different encryption methods, a point discussed later. The invariants are not 1:1 functions, and entail a loss of information. Some loss is inherent in the situation: what is undoubtedly plaintext encrypted with a certain key could, conceivably, be an unrelated, extremely odd-looking plaintext encrypted with another key. However, most of the proposed invariants sacrifice very little information and will always produce sufficient information to give a near-zero probability of identifying a false, coincidental pattern. For some invariants, the amount of information loss is exactly the amount of information in the key, which is the best possible situation. For other invariants, there is some additional information loss. In such a case it may be desirable to provide additional corroboration for the match by using other techniques, as will be discussed later.

In all the following, let $T_i$ be the ith byte of the plaintext, and k be the encryption key. $S_i$, the ith byte of the encrypted text, is defined by T and k. $\Delta S_i$, the ith byte of a proposed invariant, must be defined in terms of S, and, when expressed in terms of T and k, must be shown to be independent of k.

1. ADD encryption: modulo 256, add the key, a 1-byte constant, to each element of the data. In the following, all operations will implicitly be performed modulo 256.
    Invariant: $\Delta S_i = S_{i+1} - S_i$. To verify this, note that
    $\Delta S_i = S_{i+1} - S_i = (T_{i+1}+k)-(T_i+k) = T_{i+1}-T_i$,
    and does not depend on k.
2. Word-wide ADD: modulo 65536, add the key, a 1-word (2-byte) constant, to each word of the data.
    Invariant: Same as for 1, except redefine everything in terms of words rather than bytes.
    Alternatively, byte $\Delta S_i = S_{2i+2} - S_{2i}$, corresponding to attending only to the low-order bytes of the plaintext, the key, and the ciphertext. Since this sacrifices half the data, patterns twice as long must be used to obtain equal confidence in a match. For either of these invariants, the word alignment must be known: it must be known which is the high order byte and which the low order byte of each word. If this is not known, both possibilities must be tried. The generalization to key lengths other than 2 bytes is immediate, and it is irrelevant whether this length is equal to the length of a word.
3. XOR encryption: take the exclusive-OR of the key, a 1-byte constant, with each element of the data.
    Invariant: $\Delta S_i = S_{i+1} \oplus S_i$ is invariant, since $\Delta S_i = S_{i+1} \oplus S_i = (T_{i+1} \oplus k) \oplus (T_i \oplus k) = T_{i+1} \oplus T_i$. In fact, this is very similar to case 1, with the added simplicity that the XOR operation is its own inverse operation.
4. Word-wide XOR encryption: take the exclusive-OR of the key, a 1-word constant, with each word of the data.
    Invariant: On a byte-wise basis, define $\Delta S_i = S_{i+2} \oplus S_i$. To see that this works, consider the 1-word key k as composed of a high-order byte k' and low-order byte k''. Depending on whether i is even or odd, either $S_i = T_i \oplus k'$ and $S_{i+2} = T_{i+2} \oplus k'$ or $S_i = T_i \oplus k''$ and $S_{i+2} = T_{i+2} \oplus k''$. Either way, the keys used for $S_i$ and $S_{i+2}$ are identical, and $S_{i+2} \oplus S_i = T_{i+2} \oplus T_i$, independent of k' and k'', i.e., independent of k.
    The generalization to key lengths other than 2 bytes is immediate, and it is irrelevant whether this length is equal to the length of a word.
5. Running-key XOR: given 1-byte keys A and B, take the exclusive-OR of the ith byte of the data with the value of A+iB modulo 256.
    Invariant: Let $\Delta S_i$ be the b least significant bits of $S_{i+2^b} \oplus S_i$, i.e., $$\Delta S_i = S_{i+2^b} \oplus S_i \bmod 2^b. \tag{1}$$

To see that $\Delta S$ is an invariant, first note that "modulo $2^b$" operations can be applied anywhere: by definition these do not affect the b least significant bits, which are all that affect the final result. Then $$\begin{aligned}\Delta S_i &= [T_{i+2^b} \oplus (A + (i + 2^b)B)] \oplus [T_i \oplus (A + iB)] \bmod 2^b \\ &= [T_{i+2^b} \oplus T_i \oplus (A + (i + 2^b)B)) \oplus (A + iB) \bmod 2^b] \bmod 2^b \\ &= T_{i+2^b} \oplus T_i \bmod 2^b.\end{aligned}$$

Note that for $b < 8$ this invariant retains less than b of each 8 bits of information, and as a result it may be desirable to corroborate any matches that have been derived from its use. The invariant based on $b=1$ ($\Delta S_i = S_{i+2} \oplus S_i$) has the advantage of being applicable to short text strings, and the disadvantage that it loses 7 of every 8 bits of information. Corroboration would be strongly advisable in such a case. At the other end of the spectrum, an invariant based on b=8 ($\Delta S_i = S_{i+256} \oplus S_i$) has the disadvantage of being applicable only to text strings longer than 256 bytes, and the advantage that the information loss is a fixed amount (approximately 256 bytes) rather than linear in the length of the text string. Thus, for an encrypted region appreciably longer than 256 bytes, corroboration is much less critical than it is for the invariant based on b=1.

Another invariant can be formed by combining the above invariant based on various values of b. Writing $\Delta S_i(b)$ to indicate the bth bit of the byte value $\Delta S_i$ where b=1 denotes the least significant bit and b=8 the most significant, the extended invariant can be expressed as:

$$\Delta S_i(b) = S_{i+2^b}(b) \oplus S_i(b). \quad (2)$$

An invariant sequence based on Equation (2) takes its least significant bits from all pairs a distance 2 apart, its second least significant bits from all pairs a distance 4 apart, and so forth; by contrast Equation (1) used the same distance required for the most significant bit under consideration for all the other bits as well, thereby garnering fewer bits in toto. Equation (2) defines an invariant because the bth bit of $2^b$ is zero, whence $$\begin{aligned}\Delta S_i(b) &= [T_{i+2^b} \oplus (A + (i + 2^b)B)](b) \oplus [T_i \oplus (A + iB)](b) \\ &= T_{i+2^b}(b) \oplus T_i \oplus (A + (i + 2^b)B))(b) \oplus (A + iB)(b) \\ &= T_{i+2^b}(b) \oplus T_i(b).\end{aligned}$$

Note that each bit of the ith invariant byte is computed from a different original byte (as well as a different bit). What is important is the collection of these bits, rather than how they are grouped into bytes of the invariant sequence $\Delta S$.

If $n \geq 2^b+1$, the invariant described in Equation (2) yields a total of $$\sum_{i=1}^{\log_2(n-1)} (n - 2^i) = \log_2(n - 1) \quad n - (2^{\log_2(n-1) + 1} - 2) \text{ bits};$$

and if $n > 2^b+1$, it yields $$\sum_{i=1}^{b} (n - 2^i) = bn - (2^{b+1} - 2) \text{ bits}.$$

As a realistic example, suppose that the keys A and B are one byte long, and the search pattern is n=24 bytes long. Then the simple invariant of Equation (1) yields a reduced pattern $1 \times (24 - 2^1) = 1 \times 22 = 22$ bits for b=1
$2 \times (24 - 2^2) = 2 \times 20 = 40$ bits for b=2
$3 \times (24 - 2^3) = 3 \times 16 = 48$ bits for b=3
$4 \times (24 - 2^4) = 4 \times 8 = 32$ bits for b=4
$5 \times 0 = 0$ bits for $b \geq 5$, while the extended invariant of Equation (2) yields a reduced pattern of $22+20+16+8=66$ bits; note the correspondence in the number of bits with given significance (given value of b) in the two cases. There are other running-key encryption variants, some of which possess similar invariants. For example, the keys can be shorter or longer than one byte, and different combinations of $\oplus$ and + can be used to generate the keys and modify the text.

6. Bit rotation: for a key value k from 0 to 7, each byte of the data is "rotated" by k bits; that is, the least significant k bits become the most significant. Alternatively, the ith byte may be rotated by a number of bits which is ik modulo 8.

Invariant: For each of the 8 possible bit rotations of $S_i$, let $\Delta S_i$ be the one having the smallest value (as a base 2 number). This is clearly an invariant: regardless of k, and in fact regardless of the amount by which $T_i$ is rotated to give $S_i$, the 8 possible rotations of $S_i$ are the same as the 8 possible rotations of $T_i$, so $S_i$ depends only on $T_i$. In fact, the values of $\Delta S$ can be precomputed for all 256 values of T, so that computing this invariant is just a matter of table-lookup in a 256-element table.

7. Plaintext: For uniformity, the case where no encryption is performed can be considered as encryption with the identity operation: $S_i = T_i$.

Invariant: $\Delta S_i = S_i$, the identity operation is trivially invariant.

The list of encryption methods above is intended to be illustrative rather than comprehensive, and likewise the invariant(s) shown for each are merely one possibility. All of the invariants illustrated above possess an additional important property: the invariant of a given string does not depend on where that string is imbedded in the text. This translational invariance is essential if speed is important or if many patterns are to be searched in parallel. However, in other applications, alternative invariants that are not translationally invariant may have certain advantages; examples of some invariants that are not translationally invariant are given in the section on "Corroborating Likely Matches", infra.

Detecting Matches Between Reduced Pattern and Reduced Text

In a typical application, such as searching a set of executable programs for patterns that are indicative of computer viruses, there may be hundreds or thousands of patterns to be matched, representing a similar number of different computer viruses. The match criterion may require an exact match, or may permit a prescribed amount of dissimilitude between the pattern and the text.

To "search" a file, first all the invariants being employed among the set of patterns to be matched must be computed over that file. For example, it may happen that ADD-encrypted viruses are relatively rare and may be found by other means (perhaps from signatures from their unencrypted regions), and that invariants (5) and (7) described above suffice for all the exclusive-or, running-key exclusive-OR, and bit-rotation encrypting viruses. In this case, these two invariants would have to be computed for the file.

Then, each invariant must be searched for patterns computed with the same invariant. For example, if a virus is known to be exclusive-or encrypting, and its signature pattern has been taken from an exclusive-or invariant, there is no point in searching for that pattern in the bit-rotation-invariant computed for the file. So, the exclusive-OR invariant computed for the file is searched for any exclusive-or invariant signature; the rotational invariant computed for the file is searched for any rotational-invariant signature; and so forth. These are now ordinary text searches, and may be accomplished by any means, including fast searches for all the signatures in parallel. Computing the invariants can be done very quickly, so the search time for several invariants is roughly just the number of invariants multiplied by the time for a simple search.

If it is not known which encryption method was used, several invariants will have to be tried. It is not quite the case that all the invariants must be tried, however. For example, the invariant (2) for word-wide ADD is also invariant for data encrypted with (1) byte-wide add, so it suffices to use just the former. Similarly, byte-wide exclusive-or is a special case of word-wide exclusive-OR, so the invariant (4) suffices in lieu of (3). Moreover, all the invariants described under (5) may be used in lieu of both (4) and (3).

Plaintext can be considered to be a special case of any of the other encryption methods. For instance, if a (plaintext) signature is present in a (plaintext) file, then certainly the rotation-invariant of the signature is present in the rotation-invariant of the file. This reduces the number of "flavors" of the file that must be searched, as usual at the expense of sacrificing some amount of data, and some amount of certainty. It is quite reasonable to do this, either extending the signatures to regain the required level of confidence, or simply double-checking the plaintext of the signature against the plaintext of the file in the rare cases that the invariant of the signature is found in the invariant of the file or, in general, double-checking the invariant with the greatest information when a match is found with a "coarser" invariant. (This is discussed in the section "Corroborating Likely Matches", infra.)

Naturally, the invariants that work for the most encryption methods are also the ones that sacrifice the most information, so in practice some balance must be struck.

Even before encryption, some patterns are more general than just fixed strings. They could be strings including "wildcards", but this is a very simple generalization easily addressed by the paradigm already presented.

A more complex scenario arises when a basic pattern is the language produced by a regular expression and a text is to be searched for encryption of this pattern. A regular expression (see for example, H. R. Lewis and C. H. Papadimitriou, Elements of the Theory of Computation, Prentice-Hall (1981)) is one standard means for specifying a language, a potentially infinite set of strings. To give an example, in abc(a∪b)*, roughly speaking the ∪ indicates the choice of an a or a b, and the * indicates repetition of the same thing any number of times, so this particular regular expression describes the set of all strings beginning with abc and ending there or continuing with any number of as and bs.

Applying invariants in this more general setting is more complicated. For example, suppose it is desired to search for any ADD encryption of any string in the language (a∪b)*. It is true that applying the usual ADD invariant (item 1 in the list of encryption-invariant transformations) produces an expression which is independent of the key, but the expression is not simple. In fact, if a and b are byte values, and a-b, b-a, and 0 represent the usual arithmetic quantities and 0 the empty string, then the set of strings which may result from applying the ADD invariant to a suing in the language (a∪b) * is precisely the language $$[0]^*[0\cup(b-a)][0^*(a-b)0^*]^*[0\cup(a-b)][0]^*.$$

The reduction is even more involved for more elaborate regular expressions. However, it is the case that this reduction, applied to a regular expression, always produces a regular expression. The proof comes from studying the deterministic finite automata (DFAs) associated with the regular expressions (again, see H. R. Lewis and C. H. Papadimitriou, supra): the states of the DFA associated with the invariants are ordered pairs of states of the original DFA.

Corroborating Likely Matches

There are two situations in which it may be important to corroborate the match obtained from the previous step. First, it may be that the invariant used to obtain the match sacrifices more than the minimal amount of information associated with the key. In this situation, it may be desirable to apply a different matching criterion (most likely a more stringent and more expensive one) to the pattern and the portion of the text that has been identified as a tentative match. Second, it may be that the invariant sacrifices no information beyond that associated with the key, but the original pattern is not sufficiently specific to announce a definite match. In this situation, a longer or more specific pattern would be supplied and compared to the text in the vicinity of the tentative match.

Both scenarios arise naturally in the context of virus searching. The first occurs for running key encryption: all of the associated invariants sacrifice extra information. The second scenario arises from a two-stage searching strategy, in which patterns as short as two or three bytes are searched, and only text that matches any of those patterns is subjected to further scrutiny, involving matches to more specific patterns.

Consider the running-key invariant with b=1. Suppose that the invariant of the text $S_i, S_{i+1}, \ldots, S_{i+l-1}$ matches the invariant of the pattern $\pi_0, \pi_1, \ldots, \pi_{l-1}$. Then one can tentatively assume that $S_i$ and $S_{i+1}$ represent $\pi_0$ and $\pi_1$ in encrypted form, and solve for the unique values of $k_1$ and $k_2$ that would make this possible: $k_1 = S_i \oplus \pi_0$, and $k_2 = (S_{i+1} \oplus \pi_i) - k_1$. Having derived $k_1$ and $k_2$, it is a trivial matter to decrypt the remainder of S and determine whether it is in fact a match to $\pi$.

In principle, this method of matching could be used in the first place. However, it is prohibitively expensive if there are several search patterns. Since the calculation of $k_1$, $k_2$, and the ensuing decryption involve an intermingling of the search pattern $\pi$ and the searched text S, the searching time is linear in the number of search patterns. By contrast, in matching invariants, the invariant of S is computed just once and searched just once for all the invariant search patterns; this can be done in time nearly constant in the number of search patterns if a hash function is used (and the hash table is sufficiently large).

In general, if a text and a search pattern (or, equivalently, two texts) share the same invariant, an additional test analogous to what is described here for running-key encryption can establish whether they are truly encryptions of one another. Although this corroborative test could in principle serve as the basis for a searching method that does not use invariant matching, such schemes tend to be impracticable. In general, it is prudent to use a two-stage approach, with invariant matching used as a first filtration step, followed by corroborative testing.

Imagine that there are hundreds or thousands of exclusive-or encryption patterns that we wish to search for. The most naive application of the invariant method would be to:

1. compute, for each pattern $\pi$, the invariant $\Delta\pi_i = \pi_{i+1} \oplus \pi_i$ (denoted $\Delta\pi$),
2. similarly compute the invariant of the encrypted text S, $\Delta S$, and
3. search $\Delta S$ for each $\Delta\pi$.

However, if the patterns $\pi$ contain wildcards, or if the matching criteria permit a certain number of mismatches between the pattern and the text, the previously given exclusive-OR invariant loses information that is retained by alternative invariants.

To see this, suppose that $\pi_k$ is a wildcard. Then both $\Delta\pi_k$ and $\Delta\pi_{k+1}$ are undetermined; i.e., one extra byte of indeterminacy is introduced into $\Delta\pi$. There are several alternative invariants that prevent such a loss of information, for example:

1. $\Delta_{alt1}\pi_i = \pi_i \oplus \pi_1$, and
2. $\Delta_{alt2}\pi_i = \pi_i \oplus \pi_{j(i)}$, where j(i) is the largest value of j<i for which $\pi_j$ is not a wildcard.

When $\pi_k$ is a wildcard, $\Delta_{alt1}$ does not induce any additional indeterminacy. $\Delta_{alt1}\pi_k$ is undetermined, but $\Delta_{alt1}\pi_{k+1} = \pi_{k+1} \oplus \pi_k$ is not. However, there is a severe disadvantage to using $\Delta_{alt1}$ if the ciphertext S is being searched for near matches to an exclusive-OR encryption of $\pi$. If a single mismatch occurs at $\pi_1$, this will prevent the match to the rest of the pattern from being noticed.

The invariant $\Delta_{alt2}$ does not share this vulnerability to a mismatch at a particular location. For example, suppose that the plaintext search pattern is:

$$\pi = (a_1, a_2, a_3, F1, a_5, a_6, V4, a_8, a_9, a_{10}) \quad (3)$$

where F1 is a token that represents a fixed wildcard with a length of one unit, and V4 is a token that represents a variable-length wildcard with a length that can be anywhere from zero to four units. The corresponding reduction of the pattern $\pi$ would be:

$$\Delta_{alt2}\pi = <a_2 \oplus a_1, a_3 \oplus a_2, F1, a_5 \oplus a_3, a_6 \oplus a_5, V4, a_8 \oplus a_6, a_9 \oplus a_8, a_{10} \oplus a_9> \quad (4)$$

where use has been made of the fact that decryption operations involving wildcards of a particular type produce wildcards of that same type. Since the reduction in Equation (4) does not depend critically on any single element of the original pattern in Equation (3), it does not fail catastrophically in the case of mismatches.

Of course, this advantage comes at a cost: $\Delta_{alt2}$ is not translationally invariant. Thus, one cannot simply search the reduction of a ciphertext for the reduction of a given search string. In principle, one would have to go sequentially through a ciphertext C, calculating the reduction of each substring of length equal to the search string $\pi$.

Fortunately, a revised two-stage searching approach solves this problem. Choose one or more substrings (or sub-patterns) of each pattern that are free of wildcards. For example, in the pattern $\pi = <a_1, a_2, a_3, F1, a_5, a_6, V4, a_8, a_9, a_{10}>$, $<a_1, a_2, a_3>$ and $<a_8, a_9, a_{10}>$ might serve as sub-patterns. Then use the standard translationally-invariant to identify matches to these sub-patterns. Then, if any matches to these sub-patterns are found, a second, corroborative step is performed, in which $\Delta_{alt2}$ is applied to the pattern and the text at the location of the sub-pattern match, and a match is declared if the invariants based on $\Delta_{alt2}$ are equivalent.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for determining whether a given text contains a given pattern, or any member of a class of possible encryptions of that pattern, or any member of a class of possible encryptions of patterns similar to the given pattern, the method comprising the steps of:
   (a) for each possible encryption of the given pattern,
       i. reducing the given pattern to a transformed pattern, the transformation having a property that it is invariant with respect to encryption of the given pattern with any allowable key,
       ii. reducing the given text to a transformed text, the transformation being the same as was applied to the given pattern,
       iii. searching for the presence of the transformed pattern, or a pattern similar to the transformed pattern, in the transformed text, and
       iv. identifying a match if the searching step detects the presence of the transformed pattern, or a pattern similar to the transformed pattern, in the transformed text.

2. The method recited in claim 1, wherein an invariant of the text is first computed in its entirety in the second reducing step and then searched.

3. The method recited in claim 1, wherein, with a predetermined granularity, a computation of an invariant of the text is interleaved with searching of the invariant.

4. The method recited in claim 1, further comprising the step of:
   (b) for each identified match,
       i. providing information on the nature of any successful match.

5. The method recited in claim 4, prior to providing information on the nature of any successful match further comprising the step of:
   (b) for each identified match,
       i. corroborating the match before declaring a successful match.

6. The method recited in claim 1 wherein the patterns are signatures of viruses and the text is computer executable code.

7. The method recited in claim 6 wherein the viruses are one of non-self-encrypting and self-encrypting viruses from a class of viruses including identity operation, ADD encryptions, exclusive-OR encryptions, bit rotation encryption, and running-key encryption.

8. The method recited in claim 7 wherein the ADD encryptions are from a class including byte-wide ADD encryption, and word-wide ADD encryption.

9. The method recited in claim 7 wherein the exclusive-OR encryptions are from a class including byte-wide exclusive OR encryption, and word-wide exclusive OR encryption.

10. The method recited in claim 4, further comprising the step of:
    (b) for each identified match,
        i. providing information on the nature of any successful match for each possible encryption, said information including identity of a matched pattern and a text file and offset where the match occurred.

11. The method recited in claim 4, wherein the provided information includes the identity of the matched pattern.

12. The method recited in claim 4, wherein the provided information includes the location of the match.

13. The method recited in claim 4, wherein the provided information includes the nature of the encryption.

14. A computing system for determining whether a given text contains a given pattern, or any member of a class of possible encryptions of that pattern, or any member of a class of possible encryptions of patterns similar to the given pattern, said computing system comprising:

first transformation means for transforming the given pattern to a transformed pattern, the transformation being performed for each of a set of possible encryption methods and having a property that it is invariant with respect to encryption of the pattern with any allowable key;

second transformation means for transforming the given text to a transformed text, the transformation being the same as was applied to the pattern;

a search engine receiving input from said first and second transformation means for searching for the presence of the transformed pattern, or a pattern similar to the transformed pattern, in the transformed text; and means responsive to said search engine for identifying a match if the search engine detects the presence of the transformed pattern, or a pattern similar to the transformed pattern, in the transformed text.

15. The computing system recited in claim 14 wherein the second transformation means computes an invariant of the text in its entirety before providing an output to said search engine.

16. The computing system recited in claim 14 wherein the second transformation means provides output to said search engine with a predetermined granularity, said search engine searching said output while said second transformation means computes an invariant of the text in an interleaved manner.

17. The computing system recited in claim 14 wherein the patterns are signatures of viruses and the text is computer executable code, said computing system further comprising output means for providing information on the nature of any successful match for each possible encryption.

18. The method recited in claim 17, wherein the provided information includes the identity of the matched pattern.

19. The method recited in claim 17, wherein the provided information includes the location of the match.

20. The method recited in claim 17, wherein the provided information includes the nature of the encryption.

21. The computing system recited in claim 17 further comprising means for corroborating the match before said output means provides information on the nature of any successful match.

22. The method recited in claim 1 wherein the encryptions include identity operation, ADD encryptions, exclusive-OR encryptions, bit rotation encryption, and running-key encryption.

23. The method recited in claim 22 wherein the ADD encryptions are from a class including byte-wide ADD encryption and world-wide ADD encryption.

24. The method recited in claim 22 wherein the exclusive-OR encryptions are from a class including byte-wide exclusive-OR encryption and world-wide exclusive-OR encryption.

* * * * *